United States Patent [19]

Miyagawa et al.

[11] 4,264,172
[45] Apr. 28, 1981

[54] CAMERA

[75] Inventors: Fumihiro Miyagawa; Kousaku Sawabe, both of Yokohama, Japan

[73] Assignee: Ricoh Co., Ltd., Japan

[21] Appl. No.: 912,319

[22] Filed: Jun. 13, 1978

[30] Foreign Application Priority Data

Jun. 7, 1977 [JP] Japan ................................. 52-66932
Jun. 13, 1977 [JP] Japan ................................. 52-69739

[51] Int. Cl.³ .......................................... G03B 17/04
[52] U.S. Cl. ................................................ 354/187
[58] Field of Search ............... 354/288, 289, 286, 295, 354/296, 202, 203, 187

[56] References Cited

U.S. PATENT DOCUMENTS

| 2,109,807 | 3/1938 | Tajima | 354/187 |
| 2,208,797 | 7/1940 | Kende | 354/187 |
| 3,682,060 | 8/1972 | Furuta | 354/202 |

FOREIGN PATENT DOCUMENTS

| 1200668 | 9/1965 | Fed. Rep. of Germany | 354/202 |
| 1233250 | 1/1967 | Fed. Rep. of Germany | 354/187 |

Primary Examiner—Donald A. Griffin
Attorney, Agent, or Firm—McGlew And Tuttle

[57] ABSTRACT

The camera includes a lens tube which is slidable relative to a body of the camera between a photographing position and a retracted position. The lens tube is moved between these two positions cooperatively with a front lid swingably mounted on the front side of the body of the camera.

3 Claims, 14 Drawing Figures

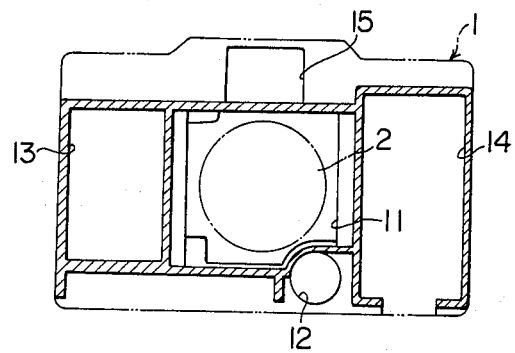
FIG. 1
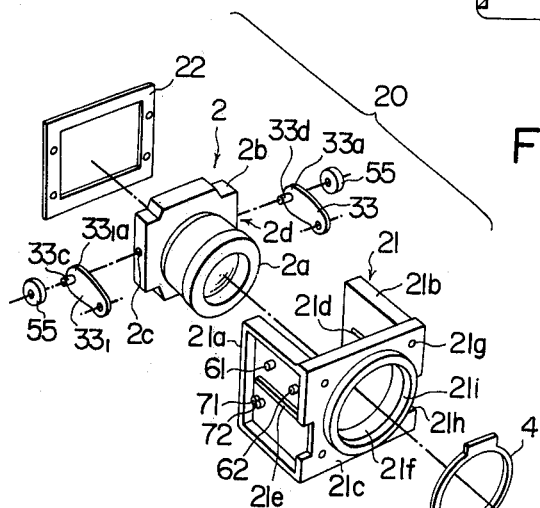
FIG. 2
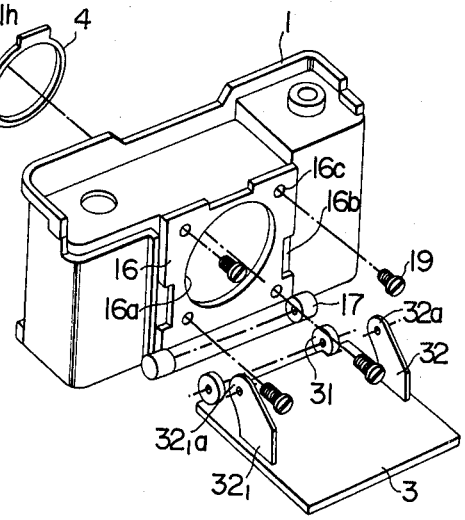
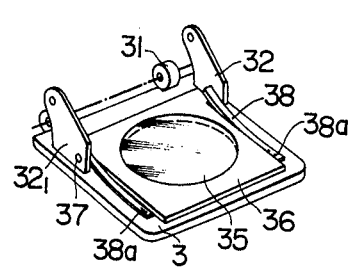
FIG. 11

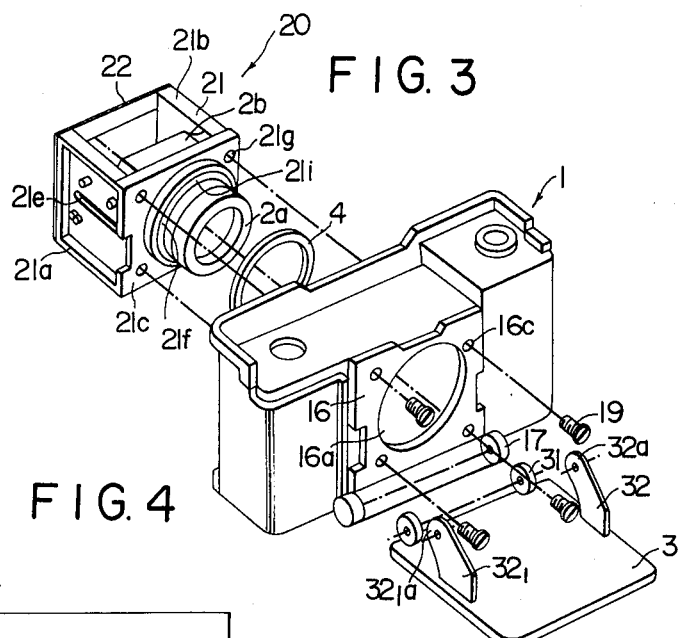
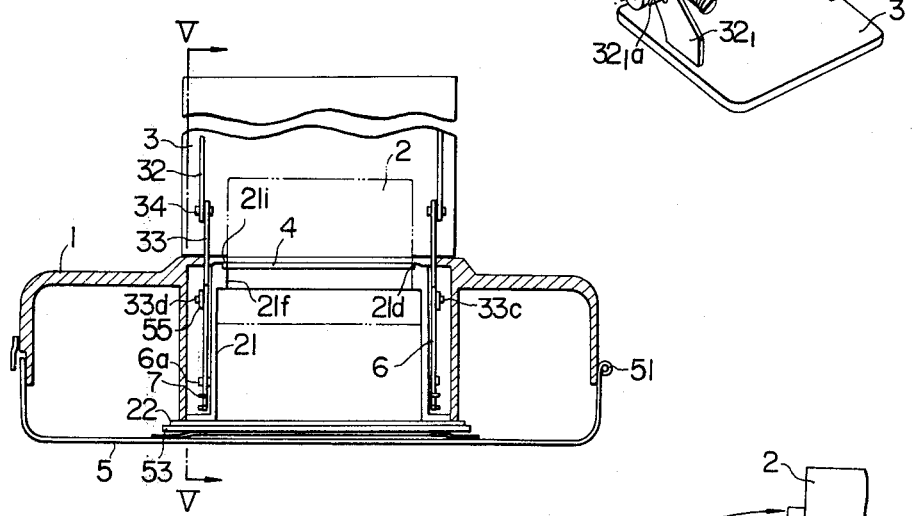
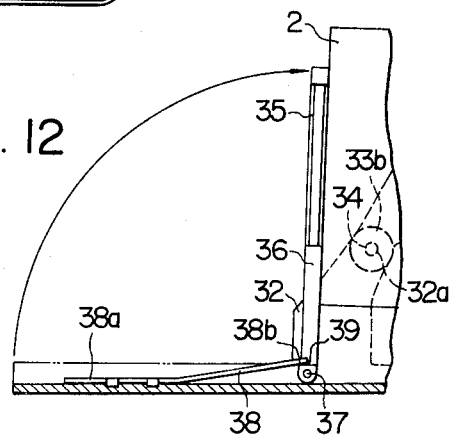

CAMERA

BACKGROUND OF THE INVENTION

The present invention relates to a camera of the type having a retractable lens tube.

Conventionally, in a camera of this type, the distance between a lens and the surface of a film is maintained by keeping the distance between a lens support member and a body of the camera constant by use of a guide frame, or with a lens tube held by a lens tube guide portion formed in the body of the camera, or by a lens tube guide frame disposed inside the body of the camera.

Furthermore, in a conventional camera, a film guide portion for guiding a film carriage is disposed in the body of the camera, separately from the lens tube guide portion or from the guide frame. Therefore, when assembling such cameras, parts which constitute the guide frame and the lens tube guide frame are individually attached to the body of each camera. This makes the assembling process lengthy and the assembling efficiency poor. Furthermore, the variation in the accuracy in size of each part, or the manufacturing tolerance, is mulitiplied. As a result, the percentage of defective lens tube guide portions or of defective guide frames is increased, so that it becomes difficult to maintain a high accuracy of the spacing between the lens and the surface of the film. Moreover, the lens tube guide portion and the guide frame are prone to be affected by the change of temperature and humidity due to their constructions. Furthermore, for attaining a lightproof sealing around the lens tube, as shown in FIG. 8 (a), a groove 1a is formed in the inner peripheral surface of a wall of a lens guide portion formed in the body of a camera and a lightproof material 4 is packed in the groove 1a.

Alternatively, the lightproof material 4 is fixedly inserted between the body of the camera and a front plate or facing of the camera. Therefore, the lightproof material is tightly pressed so that it loses elasticity. As a result, a light leakage occurs. In case the lightproof material 4 is fixedly mounted as mentioned above, it is very difficult to determine and control the thickness of the lightproof material 4 so as to be capable of recovering its original shape and size. When the thickness of the lightproof material 4 is varied, it becomes impossible to project or retract the lens tube smoothly due to the high load caused during reciprocation of the lens tube. When some force is applied against the great load, the lightproof material 4 is deformed or frictioned so that a light leakage is apt to occur. Accordingly, lightproof sealing around the lens tube is difficult.

Furthermore, in a conventional camera of the type in which the lens tube is retractable into the body of the camera, a battery box is in an upper portion in the camera. More specifically, referring to FIG. 9, a battery box 12 is located on a right upper side of a retractable lens tube 2, parallel to the retracting direction of the lens tube 2.

In the case of this camera, when the battery box 12 is located in the upper portion of the body of the camera, the battery box 12 projects into a lightproof box 11 if the battery box 12 is a large one. As a result, a space w between the lens tube 2 and the battery box 12 becomes so small that a sufficient space for a lightproof seal cannot be obtained. Particularly in the range from a photographing position, where the lens tube 2 projects outwardly, to a position where a front lid is half-opened in retracting the lens tube 2, lightproof sealing around the lens tube 2 becomes difficult, so that direct light from the sun is apt to enter the lightproof box 11.

Eliminating the projection of the battery box 12 into the lightproof box 11 may be effective for attaining lightproof sealing around the lens tube 2. However, it is not always a good measure in the case of a very small size camera in view of an effective arrangement of the other mechanisms in the camera. In short, so long as the battery box 12 is located in the upper portion of the camera, lightproof sealing of the camera becomes difficult since direct light from the sun is more likely to enter the camera from an upper portion of camera than from a lower portion of the camera.

Moreover, when the battery box 12 is located in the upper portion of the camera, the battery has to be dismounted from the upper portion or from the front portion of the camera. Particularly in the case of a compact camera, this is not preferable in view of the design.

Furthermore, in the conventional camera, a filter is attached to the lens tube by use of a filter ring and, when the filter is not in use, it is detached from the lens tube and is carried somehow by a photographer. However, the carrying of the detached filter is sometimes troublesome, and the filter is apt to be misplaced after use.

However, in the case of the camera of the type having a retractable lens tube, in view of the design of the camera, it is difficult and not preferable to design the filter so as to attach a filter to the front portion of a lens tube normally and to retract it from the optical path of the lens tube when it is not in use.

SUMMARY OF THE INVENTION

It is therefore a primary object of the present invention to provide a camera, of the type having a retractable lens tube employing a lens tube support device, in which a high accuracy in maintaining the spacing between a lens tube and the surface of a film is possible, and which can be assembled and disassembled efficiently.

Another object of the invention is to provide a camera of the type having a retractable lens tube in which lightproof sealing of the camera is improved by use of a lightproof member.

A further object of the invention is to provide a camera of the type having a retractable lens, in which a battery box is disposed in a position so as to reduce the the amount of light which may enter a lightproof box from around the lens tube.

A further object of the invention is to provide a camera of the type having a retractable lens tube, in which a filter is normally constantly attached to the body of the camera.

In one embodiment of a camera of the invention having a retractable lens tube, a lens tube, a lens tube guide frame and a film pressure plate are constructed in the form of a single housing, and the thus constructed housing is inserted from the back side into the body of the camera and fixed thereto. According to this construction, before the housing is attached to the body of the camera, the configuration of a lens and the surface of a film can be adjusted with a high accuracy and, after the attachment of the housing, the above-mentioned configuration is maintained without a readjustment. Furthermore, since the housing is assembled as a single unit, the efficiency of the next attachment work of the housing is high and the thus constructed lens support device is not affected by the change of temperature and humidity. In this embodiment, an elastic lightproof material is inserted between a front plate of the camera and a central plate of a lens tube guide frame of the camera, whereby lightproof sealing of the lens tube is secured.

In another embodiment of the camera of the invention having a retractable lens tube, a battery box is disposed in a lower portion of the body of the camera so that direct light from the sun is prevented from entering a gap between the battery box and the lens tube since direct light from the sun is weakened or shut off by the lens tube itself and a front lid of the camera.

In a further embodiment of the camera of the invention having a retractable lens tube, a filter is disposed inside a front lid of the camera and the filter can be raised from the front lid so as to cover the front portion of the lens tube when the filter is used. When the filter is not in use, it is laid down on the inside of the front lid.

BRIEF DESCRIPTION OF THE DRAWINGS

FIG. 1 is a schematic sectional side view of an embodiment of a camera of the invention having a retractable lens tube.

FIG. 2 is an exploded fragmentary perspective illustration of the camera of FIG. 1.

FIG. 3 is a schematic fragmentary perspective illustration of a housing and a body of the camera of FIG. 1.

FIG. 4 is a schematic transverse sectional view of the camera of FIG. 1.

FIG. 11 is a schematic fragmentary perspective view of a front lid with a filter of the invention.

FIG. 12 is a schematic sectional side view of the front lid with the filter of FIG. 11, in which the front lid is opened and the filter is raised.

DETAILED DESCRIPTION OF THE PREFERRED EMBODIMENTS

Figure 5:
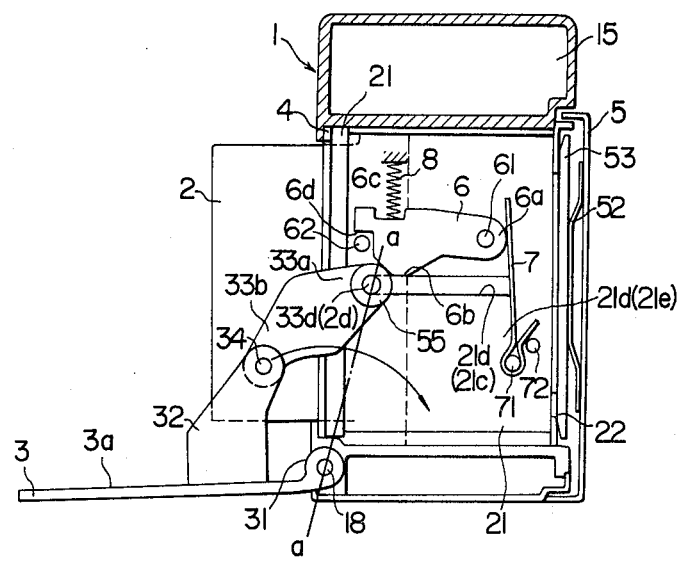
FIG. 5 is a schematic sectional view taken on line V—V of FIG. 4, in which a front lid is opened.

Referring to FIGS. 1 and 2, reference numeral 1 represents a camera body of a camera of the type whose lens tube 2 can be retractable into the camera body 1 cooperatively with a front lid 3 in accordance with the present invention.

Referring particularly to FIG. 1, a battery box 12 is disposed on the right and lower side of a lightproof box 11 fitted with the lens tube 2. On opposite sides of the lens tube 2, there are disposed film chambers 13, 14. Above the lens tube 2 is situated a mechanical chamber 15 in which an exposure control mechanism and a finder mechanism are disposed.

Referring particularly to FIG. 2, a front plate 16 is disposed integrally with the camera body 1 in the central portion thereof. In the front plate 16, there is formed an opening 16a for fitting a lens tube portion 2a of the lens tube 2 therein.

As illustrated in FIG. 2, the lens tube 2 comprises the lens tube portion 2a and a lens tube support member 2b. On the outside of the lens tube 2 there is disposed a U-shaped lens tube guide frame 21. The U-shaped lens tube guide 21 comprises two side plates 21a, 21b disposed on the opening side of the frame 21 and a central plate 21c on the closing side thereof. In the respective middle portions of the side plates 21a, 21b, there are formed transverse grooves 21e, 21d, respectively and, in the central plate 21c, there is formed an opening 21f for fitting the lens tube portion 2a therein.

In holes 2c, 2d formed on opposite sides of the lens tube support member 2b, respective pins 33c, 33d are rotatably fitted, which are fixed to a pair of intermediate levers 33 at their respective ends. The pins 33c, 33d pass through the transverse grooves 21e, 21d and are slidable along the transverse grooves 21e, 21d, respectively. On the opening ends of the side plates 21a, 21b, there is fixed a film support plate 22. As illustrated in FIG. 3, the lens tube 2, the lens tube guide frame 21 and the film support plate 21 are assembled so as to form a housing 20. The thus formed housing 20 is inserted into the lightproof box 11 from the back side of the camera body 1, with a ring-shaped lightproof member 4 being fitted on the outer peripheral portion of the lens tube portion 2a. The housing 20 inserted into the camera body 1 is fixed to the front plate 16 by screws 19 screwed into holes 16c formed in the front plate 16 and tapped holes 21g formed in the central plate 21c. An outer end portion of the lens tube portion 2a is projected from the front portion of the camera body 1, passing through the opening 21f and the opening 16a.

Referring to FIG. 4, on the back side of the camera body 1, a back lid 5 is mounted swingably on a hinge 51. Inside the back lid 5, a film pressure plate 53 is provided so as to bring a film (not shown) into pressure contact with the film support plate 22 by a spring member 52 (FIG. 5). The front lid 3, attached to the front portion of the camera body 1, is swingably mounted on a shaft 18 (refer to FIG. 5) fitted in the holes of shaft supporting members 17 (see FIG. 2) fixed to the camera body.

Referring now back to FIG. 2, in order to make the lens tube 2 retractable cooperatively with the front lid 3, pins 33c, 33d fixed respectively to corresponding just end $33_1a$ of an intermediate lever $33_1$ and 33 of an intermediate lever 33, which pass through the transverse grooves 21e, 21d, respectively, are fitted into the holes 2c, 2d formed on opposite sides of the lens tube support member 2b. Here the intermediate levers 33, $33_1$ are identical in shape and function.

On opposite sides of the front lid 3, just ends of a lever 32 a lever $32_1$ are fixed. Again, the levers 32, and $32_1$ are identical in shape and function.

Figure 6:
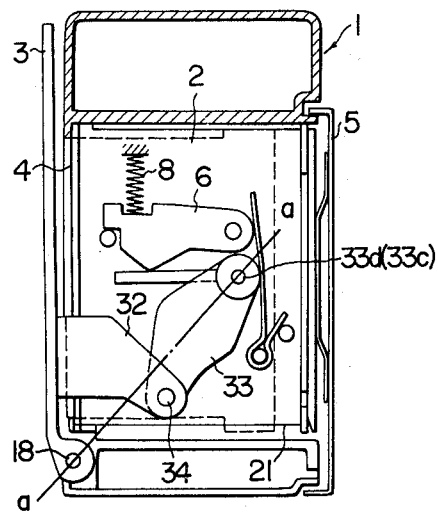
FIG. 6 is a schematic sectional view taken on line V—V of FIG. 4, in which the front lid is closed.
Figure 13:
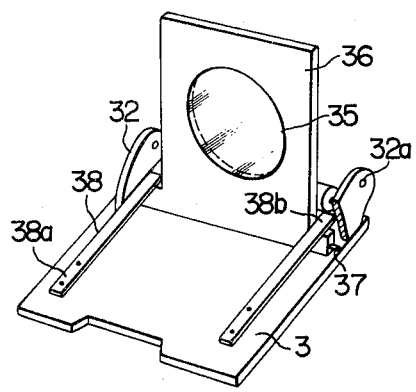
FIG. 13 is a schematic perspective view of the front lid and the filter of FIG. 11.

Referring to FIGS. 5 and 6, the retraction of the lens tube 2 will be described. Hereinafter, with respect to members identical in shape and function and disposed symmetrically on opposite side of the camera body 1, such as the levers 32, $32_1$, the levers 33, $33_1$ and other members which are operated cooperatively with the respective levers, only the members disposed on one side of the camera body will be described for simplicity and a better understanding of the respective functions of the members. In FIG. 5, a pin 34 is fitted into a hole formed in the other end 33b of the intermediate lever 33 and into a hole formed in the other end 32a of the lever 32 in such manner that the intermediate lever 33 is rotatable relative to the lever 32. A roller 55 is rotatably mounted on the pin 33d. On each side of the lens tube 5 guide frame 21, four pins 61, 62, 71, 72 are embedded (refer to FIG. 2 as well). The pin 61 is fitted into a hole formed in one end 6a of a stopper lever 6 which is swingable about the pin 61. A free end of a spring 7, whose other end is fixed by the pins 71, 72, is brought 10 into pressure contact with the end 6a of the stopper lever 6.

On the lower and upper sides of the stopper lever, there are formed a projected portion 6b and a notch 6c, respectively, and, at the tip of the stopper lever 6, there 15 is formed a notch 6d. The projected portion 6b is in contact with the roller 55. Between a fixed portion of the lens tube guide frame 21 and the notch 6c, there is mounted an expanding or compression spring 8 so that the stopper lever is always under a doward bias. Below 20 a notch 6d is situated the pin 62.

When the housing 20 is inserted into the lightproof box 11 of the camera body 1, the configuration of a lens and a film surface (not shown) is checked and adjusted so as to obtain a correct configuration thereof, and a 25 smooth movement of the lens tube support member 26 along the lens tube guide frame 21 is also checked. As mentioned previously, the pin 61 of the frame 21 mounts the stopper lever 6, and the expanding spring 8 biases the stopper lever 6. Furthermore, one end portion of the 30 spring 7 is fixed to the pins 71, 72. In the hole 2d, formed in one side of the lens tube support member 2b, there is fitted the pin 33d which passes through the transverse groove 21d, and which is fixed to one end of the intermediate lever 33.

The portion 33b of the intermediate lever 33 extends through a groove 21h, formed on one side of the central plate 21c, and through a groove 16b formed, on one of the front plate 16, to the front side of the camera body 1. As mentioned previously, the hole in one end 32a of 40 the lever 32 is caused to mate with a hole in the tip portion 32b of the lever 33 so that the two levers 32, 33 are connected by the pin 34 passing through the respective holes of these levers 32, 33.

Supposing that the lever 32 is connected with the 45 lever 33 and that a line connecting the axis of the shaft 18, which is rotatably supported on the camera body 1, and the center of the hole 2d is a line a—a, when the pin 34 is located on the left of the line a—a as shown in FIG. 5, the roller 55 is pushed by an edge on the front lid 3 50 side of the projected portion 6b of the lever 6 so that the front lid 3 is opened abruptly and, when the front lid 3 is rotated in the closing direction, the pin 33d of the lever 33 is caused to slide along the transverse groove 21d. At the same time, the pin 34 is rotated clockwise in 55 the direction of the arrow about the shaft 18. Then the roller 55, which is rotatably mounted on the pin 33d, climbs over the projected portions 6b of the lever 6 and slides to the right in FIG. 5. This results in the end portion 33a of the lever 33 coming into contact with the 60 spring 7, and it is then biased by the spring 7. In this position, when the pin 34 is moved to the right a little beyond the line a—a, a parallel movement of the lever 33 along the groove 21d is changed to a counterclockwise rotation of the lever 33 about the pin 33d so that 65 the front lid 3 is closed abruptly. At the same time, the lens tube 2 is retracted into the lightproof box 11 so that the lid 3 covers the lens tube 2. When the thus retracted lens tube 2 is pulled from the lightproof box 11, the above-mentioned operation is reversed. To be more specific, when the lid 3 is opened, the pin 34 is moved from the right to the left in FIG. 6, and when the pin 34 is moved beyond the line a—a, the pin 33d is caused to slide quickly along the groove 21d, so that the lens tube portion 2a is projected from the front side of the camera body 1.

Figure 7:
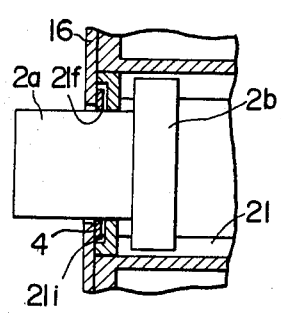
FIG. 7 is an enlarged sectional view of a main portion of the lens tube attached to the body of the camera, in which a lightproof material is fitted.
Figure 10:
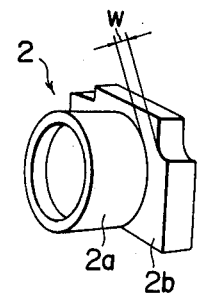
FIG. 10 is a schematic perspective view of part of the camera of FIG. 9.
Figure 8A:
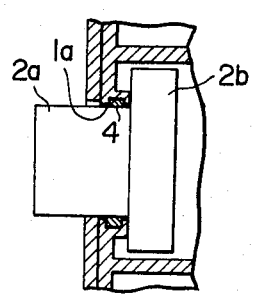
FIGS. 8 (a) and (b) show enlarged sectional views of conventional lens tubes, in which the conventional lightproof materials are fitted.
Figure 8B:
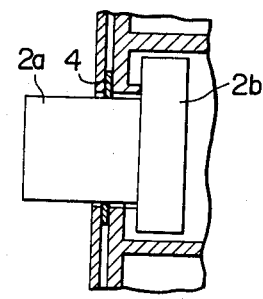
Figure 9:
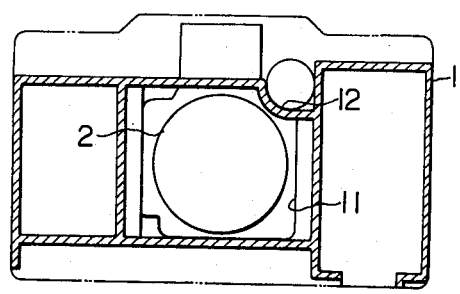
FIG. 9 is a schematic sectional front view of a conventional camera having a retractable lens tube.

When the housing 20 is inserted into the camera body 1, lightproofing of a gap between the housing 20 and the camera body 1 is effected by an appropriate means. For example, the ring-shaped lightproof member 4 shown in FIG. 2 is fitted on the portion 2a and, as shown in FIGS. 2 and 7, a step portion 21i is formed at the inner peripheral wall of the opening 21f formed in the lens tube guide frame 21 of the housing 20. The diameter of the step portion 21i is a little greater than the outer diameter of the lightproof member 4. Furthermore, the step portion 21i is wider than the thickness of the member 4. In a space thus formed between the step portion 21i and the outer peripheral surface of the lens tube portion 2a, the light-proof member 4 is inserted floatingly, and the front plate 16 of the camera body 1 and the central plate 21c of the housing 20 are fixed in close contact with each other as illustrated in FIG. 7, whereby light leakage into the lightproof box 11 from a gap between the portion 2a and the opening 16a of the front plate 16 and from a gap between the portion 2a and the opening 21f of the frame 21 is completely blocked. With respect to the grooves 16b, 21h through which the levers 32, 33 go in and out, lightproofing can be made by a method similar to the abovementioned method. It is preferable to use an elastic material as the lightproof member 4 for a closer contact of the lens tube 2 with the front plate 16 and for an easy recovery of the original size and shape of the lightproof member 4 after being pressed.

Referring to FIG. 11, there is shown another embodiment of the invention, in which a filter 35 is provided inside the front lid 3. In this embodiment, when taking photographs by use of a filter, the filter 35 is caused to stand up from the front lid 3 so as to cover the front portion of the lens tube 2. When the filter 35, which has been caused to stand up, is not used any longer, the filter 35 is laid down by rotating the filter 35 about pins 37 against the bias of a pair of leaf springs 38 or by closing the lid 3 so that the filter is laid down on the inside of the front lid 3 since once the filter 35 is laid down on the inside of the lid 3, the filter is kept laid down even if the lid 3 is opened again.

The mechanism of the filter 35 will be now described in more detail. Inside the lid 3, there is provided the filter 35 in such manner as to be capable of covering the front portion of the lens tube 2a. The filter 35 is mounted on a support plate 36. On opposite sides of the bottom portion of the plate 36, there are fixed the pair of shafts 37, 37, which are rotatably engaged through the levers $32_1$, 32, whereby the support plate 36 is supported rotatably relative to the front lid 3. Inside the front lid 3, the pair of leaf springs 38 are provided, each having one end 38a fixed to the front lid 3. The free ends 38b of the plates 38 press pins or step portions 39 fixed to the support plate 36, so that, when the support plate 36 is caused to stand up, the filter 35 is brought into close contact with the front portion of the lens tube 2a and, when the support plate 36 is laid down, the plate 36 is caused to come into close contact with the inner side of the plate 36. The shafts 37, 37 can be rotatably mounted on any other shaft or pin portion of the front lid 3. Furthermore, the support plate 36 can be detachably mounted so that it can be replaced with a lens for use with close-up photography.

While specific embodiments of the invention have been shown and described in detail to illustrate the application of the principles of the invention, it will be understood that the invention may be embodied otherwise without departing from such principles.

What is claimed is:

1. A camera, of the type having a retractable lens tube which is retractable into a body of the camera, comprising:
    a housing comprising integrally a lens tube support member attached to said retractable lens tube, a film support member disposed behind said tube support member, and a lens tube guide frame having an opening for said lens tube to pass therethrough and having guide means for guiding said lens tube support member during reciprocation thereof, said housing being capable of being inserted into the body of said camera from the back side of said camera,
    a front lid for covering a lens of said retractable lens tube cooperatively with said retractable lens tube when said retractable lens tube is retracted into the body of said camera, and
    a filter disposed inside said front lid and which can be raised from said lid so as to cover said lens.

2. A camera, of the type having a retractable lens tube which is retractable into a body of the camera, comprising:
    a housing comprising integrally a lens tube support member attached to said retractable lens tube, a film support member disposed behind said tube support member, and a lens tube guide frame having an opening for said lens tube to pass therethrough and having guide means for guiding said lens tube support member during reciprocation thereof, said housing being capable of being inserted into the body of said camera from the back side of said camera,
    a front lid for covering a lens of said retractable lens tube cooperatively with said retractable lens tube is retracted into the body of said camera, and
    a filter disposed inside said front lind, which is swingably mounted on a shaft disposed in a lower portion of said front lid.

3. A camera, of the type having a retractable lens tube which is retractable into a body of the camera, comprising:
    a housing comprising integrally a lens tube support member attached to said retractable lens tube, a film support member disposed behind said tube support member, and a lens tube guide frame having an opening for said lens tube to pass therethrough and having guide means for guiding said lens tube support member during reciprocation thereof, said housing being capable of being inserted into the body of said camera from the back side of said camera,
    a front lid for covering a lens of said retractable lens tube cooperatively with said retractable lens tube when said retractable lens tube is retracted into the body of said camera, and
    said lens tube support member having respective pins on opposite sides thereof, said lens tube guide frame being U-shaped, having two side plates and one central plate connecting said two side plates and having said opening for said lens tube to pass therethrough, each of said two side plates having a slot parallel to the retracting direction of said lens tube for guiding said pins of said lens tube support member, said guide means comprises a pair of first levers, each having a first end pivotally mounted on a respective one of said pins of said lens tube support member, and a pair of second levers, each having one end connected to the other end of a respective first lever, and the other ends of which are fixed to said front lid.

* * * * *